United States Patent [19]

Speranza et al.

[11] 4,452,922

[45] Jun. 5, 1984

[54] POLYAMIDE CO-POLYMER POLYOLS MADE WITH DIESTERS AND DIAMINES AND POLYURETHANES THEREFROM

[75] Inventors: George P. Speranza; Robert L. Zimmerman, both of Austin, Tex.

[73] Assignee: Texaco Inc., White Plains, N.Y.

[21] Appl. No.: 468,430

[22] Filed: Feb. 22, 1983

[51] Int. Cl.$^3$ .............................................. C08G 18/14
[52] U.S. Cl. .................................... 521/137; 524/762; 525/411; 525/430; 525/433; 528/288; 528/289
[58] Field of Search ...................... 524/762; 521/137; 525/411, 430, 533; 528/289, 288

[56] References Cited

U.S. PATENT DOCUMENTS

| | | | |
|---|---|---|---|
| 3,666,724 | 5/1972 | Hostettler | 521/172 |
| 3,917,740 | 11/1975 | Siclani et al. | 524/762 |
| 4,089,835 | 5/1978 | König et al. | 324/100 |
| 4,118,376 | 10/1978 | Pedain et al. | 528/59 |
| 4,181,641 | 1/1980 | Boldebuck et al. | 524/762 |
| 4,296,213 | 10/1981 | Cuscurida et al. | 521/166 |

*Primary Examiner*—Maurice J. Welsh
*Attorney, Agent, or Firm*—Robert A. Kulason; Jack H. Park; David L. Mossman

[57] ABSTRACT

A polyamide co-polymer polyol made by the reaction of a dicarboxylic acid diester with a diamine in the presence of a polyether polyol is described. The nylon formed should be present in the polyol in an amount of from 1 to 30 wt. %. The polyether polyol may have a molecular weight of about 2,000 to 8,000. This polyamide co-polymer polyol may be used in the manufacture of elastomers and flexible polyurethane foams which are characterized by good load bearing properties.

8 Claims, No Drawings

POLYAMIDE CO-POLYMER POLYOLS MADE WITH DIESTERS AND DIAMINES AND POLYURETHANES THEREFROM

BACKGROUND OF THE INVENTION

1. Field of the Invention

The invention pertains to the field of polyurethane plastics and more particularly relates to polyurethane plastics made using novel polyamide co-polymer polyols.

2. Description of Related Compositions

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2,000 to 3,000 and above. These polyols are then reacted with polyisocyanate in the presence of water or other blowing agents such as fluorocarbons to obtain polyurethane foams. Polyols have been modified in many ways in attempts to improve the properties of the resulting polyurethane.

One common method of modifying polyols involves using "fillers" or compounds dispersed throughout the polyol.

The invention disclosed in U.S. Pat. No. 4,118,376 concerns a hydrocurable composition suitable for use as coatings, adhesives or grouts. The composition contains oxazolidine compounds and free isocyanate groups containing prepolymers where the prepolymers are obtained by the reaction of polyisocyanates with special types of dispersions where the dispersed phase is synthesized in situ in a dispersing media of polyhydroxyl compounds.

A polymer-modified polyol may be formed by polymerizing an alkanolamine with an organic polyisocyanate in the presence of a polyol as taught by Texaco Inc.'s U.S. Pat. No. 4,296,213. The alkanolamine may react polyfunctionally with the polyisocyanate to produce polyaddition products which may constitute a stable dispersion in the polyol. The resulting modified polyol is stated to be particularly useful as a polyol starting material for reaction with a polyisocyanate in the manufacture of polyurethane foam.

The polyurea polymer polyols may be made by the reaction of a hydroxyl-containing amine, a polyether polyol of about 2,000 to 8,000 molecular weight and an organic polyisocyanate. The hydroxyl-containing amines contemplated therein are described as ranging in molecular weight from about 60 to 200, preferably from about 60 to about 150.

Stable dispersions are also revealed in U.S. Pat. No. 4,089,835. Here, the stable dispersions comprise polyureas and/or polyhydrazo-dicarbonamides as the disperse phase in a hydroxyl group-containing material selected from the group of polyethers, polyesters, polyester amides and polycarbonates. These dispersions may be produced by reacting organic polyisocyanates with polyamines containing primary and/or secondary amino groups and/or hydrazines and/or hydrazides in the hydroxyl-containing material.

Similar polymer polyols prepared in the presence of water to reduce viscosity are taught as being useful in high resilience (HR) foams, according to U.S. Pat. No. 4,093,569. In this patent description, low viscosity dispersions are produced by reacting organic polyisocyanates with compounds having primary and/or secondary amino groups and/or primary hydroxyl groups in compounds having at least one hydroxyl group in the presence of more than 4% by weight of water.

An equilibrium product of two polyols, at least one of which is a polyester polyol, can be accomplished by heating the components at 230° C. in the presence of tetraisopropyl titanate as a catalyst. This equilibrium product is taught by U.S. Pat. 3,666,724 as a co-polymer which gives a better resulting foam.

Other prior art describes modified polyols in which vinyl monomers such as styrene or acrylonitrile have been polymerized or co-polymerized to improve the properties of the polyol and thus, the properties of the resulting foam. However, some of these prior art materials are highly toxic and require, in addition, stripping of unreacted vinyl monomers.

Polyurethanes made from acrylonitrile co-polymer polyols have been frequently used as carpet underlay. However, such materials are suspected of picking up or forming biocides. One approach to reducing the acrylonitrile portion is to employ maleic anhydride to provide a double bond to the polyol to make it more reactive with the higher styrene proportion.

One object of this invention is to provide highly resilient flexible foams and elastomers which use no acrylonitrile at all.

SUMMARY OF THE INVENTION

The invention concerns a polyamide co-polymer polyol dispersion for use in highly resilient flexible foams and elastomers made by the reaction of about equimolar amounts of a dicarboxylic acid diester with a diamine in the presence of a polyether polyol wherein the combined portion of dicarboxylic acid diester-diamine co-polymer ranges from about 1 to 30 wt. % of the polyether polyol.

DESCRIPTION OF THE PREFERRED EMBODIMENTS

The polyamide co-polymer polyols of this invention are made by reacting a dicarboxylic acid or ester derivative thereof with a diamine in the presence of a polyether polyol. In other words, a nylon dispersion within the polyol is created. It is anticipated that any nylon would work, although some would certainly perform better than others in a polyol dispersion for the preparation of polyurethanes.

All that is needed for the dispersed phase is an equimolar reaction of a dicarboxylic acid or ester derivative thereof and an aliphatic amine. As will be seen in Example V, reacting the diester and diamine at a mole ratio other than about 1:1 gives a polyol that produces unsatisfactory foam. Preferably, the diester is selected from the group consisting of dialkyl oxalates and dialkyl adipates. Examples are diethyl oxalate and dimethyl adipate. Preferably, the diamine should not contain ether linkages, as will be shown. It is preferred that hexamethylenediamine and piperazine be used as the diamines. As will be demonstrated, lower molecular weight amines such as ethylenediamine are unsuitable. It is especially preferred that the nylon created by nylon 6,6, also known as poly(hexamethylene adipamide) which is made from the reaction of 1,6-hexamethylenediamine and adipic acid (or dimethyl adipate).

As noted, however, many other nylons would probably also be useful. For example, polycaprolactam (nylon 6), poly(hexamethylene sebacamide) (nylon 6,10), alkoxy substituted nylons, polymers of the lactam of 12-amino-dodecanoic acid, polymers from piperazine adipate, piperazine sebacate, nylons from glutaric and adipic acids or esters would be useful, among others.

The preparation of the diester and diamine reactants and the reaction between them that forms the nylon is well known in the art. See, for example, Billmeyer, *Textbook of Polymer Science,* Second Edition, Wiley-Interscience, New York, 1971, pp. 433-437.

The polyether polyol which is used has a hydroxyl number preferably between about 20 and 60. The polyol is generally an alkylene oxide adduct of a polyhydric alcohol, preferably a trihydric alcohol, with a functionality of from about 2 to about 4. The alkylene oxide may suitably be ethylene oxide, propylene oxide, or 1,2-butylene oxide or a mixture of some or all of these. The polyol will preferably have a molecular weight within the range of from about 2,000 to about 10,000 and more preferably, from about 2,000 to about 8,000. The alkylene oxide is preferably propylene oxide or a mixture of propylene oxide and ethylene oxide.

Preferably the combined portion of dicarboxylic acid or ester thereof and aliphatic diamine is about 1 to about 30 wt. % of the polyamide polyol portion. It is especially preferred that this proportion be 5 to 20 wt. %. This combined portion of diester and diamine (the nylon) is also known as the dispersed phase. While the materials of this invention are sometimes referred to in the singular as a "polyol", it must be realized that what actually results is a mixture of highly similar polyols.

to make foams, the polyamide co-polymer polyol prepared from the above ingredients is incorporated into a formulation which results in a polyurethane product. The polyamine polymer polyol may be used in conjunction with a polyisocyanate such as those described below or may be combined with additional polyol, such as those mentioned above and others, and reacted with a polyisocyanate to form a resulting polyurethane foam product.

The advantage of the foam-forming method of our invention using the polyurethane polymer polyols described herein is that flexible urethane foams and elastomers can be produced which are firmer and stronger than similar products made using conventional polyols. Further, the method of this invention avoids the use of possibly harmful acrylonitrile.

The polyisocyanate useful for making foams may be chosen from the following polyisocyanates, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

Catalysts have long been considered necessary for the formation of polyurethanes. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which the hydroxyl-containing molecule is reacted with the isocyanate-containing molecule to form a urethane. This increases the viscosity of the mixture and provides a polyurethane containing secondary nitrogen atoms in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc. is employed, but is essential if all or even part of the gas for foam generation is to be generated by this in situ reaction (e.g., in the preparation of "one-shot" flexible polyurethane foams). Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal carboxylates. In other words, salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as Ti(OR)$_4'$, Sn(OR)$_4'$, Al(OR)$_3'$, and the like, wherein R is alkyl or aryl, and the reaction products of alcoholates with carboxylic acids, beta-diketones, and 2-(N,N-dialkylamino)alkanols;

(g) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polyester polymer polyol and any additional polyol present. The organic blowing agents optionally used along with the water are known in the art and are, for example, monofluorotrichloromethane, difluorodichloromethane, methylene dichloride and others generally known in the art.

Water and blowing agents are not used in the preparation of polyurethane elastomers. These materials do not contain foam cells.

Additives to regulate the cell size and the cell structure, for example, silicone oil such as dimethylpolysiloxanes may also be added to the foaming mixture. Fillers, flame retarding additives, dyes or plasticizers of known types may also be used. These and other additives are well known to those skilled in the art.

The invention an its improvement over the art will now be illustrated with the aid of the following examples. These examples are intended to illustrate the invention but are not intended to delineate the expected scope of the invention.

EXAMPLE I

Examples of Polyamide Co-polymer Polyol Preparation

In a 2-liter, three-necked flask equipped with a mechanical stirrer, thermometer and distillation head was placed 900 g of THANOL® SF-5505, 51 g (0.349 moles) of diethyl oxalate and 90 g (0.698 moles) of 90% 1,6hexamethylenediamine. THANOL SF-5505 polyol is a 5500 molecular weight polyether triol based on a glycerine initiator containing approximately 80% primary hydroxyl groups, a product of Texaco Chemical Company. The reaction was then heated to 150° C. and held for two hours. The ethanol formed during this period was distilled off. The reaction was then placed under 10 mm Hg vacuum to remove the last of the ethanol and water. The resulting polyol had an hydroxyl number of 65 and amine equivalents of 0.59 meq/g. It was also white and opaque.

EXAMPLE II

In a 2-liter, three-necked Morton flask equipped with a mechanical stirrer, thermometer, two addition funnels and a distillation head was placed 900 g of THANOL SF-5505. It was heated to 150° C., then the 1,6-hexamethylenediamine (75.8 g, 90% aqueous, 0.588 moles) and 85.8 g (0.588 moles) of diethyl oxalate were slowly added. As they were being added the ethanol formed was being distilled. The reaction was held at 150° C. for two hours after the addition had been completed, then for one-half hour under 10 mm Hg vacuum. The resulting polyol was white and opaque with an hydroxyl number of 21 and amine equivalent of 0.04 meq/g.

EXAMPLE III

In this example the same procedure as in Example II was used except the charge was 900 g of THANOL SF-5505, 50.2 g (0.344 moles) of diethyl oxalate and 81.5 g (0.344 moles) of JEFFAMINE® D-230 (a polyoxypropylenediamine of about 230 molecular weight sold by Texaco Chemical Co.). The resulting polyol phase separated. Thus, a diamine that contains an ether linkage does not work well in this invention.

EXAMPLE IV

A 2-liter, three-necked Morton flask equipped as in Example II was charged with 900 g of THANOL SF-5505 and then heated to 150° C. At this temperature 35.7 g (0.433 moles) of 90% 1,6-hexamethylenediamine and 77.0 g (0.433 moles) of dimethyl adipate were added. The reaction was then heated to 200° C. and held at this temperature for nine hours. It was then cooled to 150° C. and placed under 10 mm Hg for one-half hour. The product had an hydroxyl number of 32 and amine equivalent of 0.04 meq/g.

EXAMPLE V

Polyurethane Preparation

|  | A | B | C |
|---|---|---|---|
| Polyol, Example I | 100 | — | — |
| Polyol, Example II | — | 100 | — |
| Polyol, Example IV | — | — | 100 |
| Water | 3.4 | 3.4 | 3.4 |
| Q2-5043[1] | 2.0 | 2.0 | 2.0 |
| Trichlorofluoromethane | 4.0 | 4.0 | 4.0 |
| FOMREZ® UL-1[2] | 0.01 | 0.01 | 0.01 |
| THANCAT® TD-33[3] | 0.25 | 0.25 | 0.25 |
| NIAX A-1[4] | 0.25 | 0.25 | 0.25 |
| THANCAT DM-70[5] | 0.25 | 0.25 | 0.25 |
| Toluene diisocyanate | 37.8 | 33.2 | 33.2 |
| MONDUR MRS[6] | 9.4 | 8.3 | 8.3 |
| Cream time, seconds | ~4 | 5 | 5 |
| Rise time, seconds | Collapsed | 90 | ~70 |
| Density, pcf | — | 1.82 | |
| Ball rebound | — | 58 | |
| Appearance | — | Good | Fair |

[1] A silicone surfactant sold by Dow-Corning.
[2] A tin catalyst sold by Witco.
[3] 33% triethylenediamine in propylene glycol, sold by Texaco Chemical Co.
[4] 70% bis(dimethylaminoethyl)ether in dipropylene glycol, Union Carbide.
[5] 70% B,B'—dimorpholinoethyl ether, 30% N,N'—dimethylpiperazine mixture made by Texaco Chemical Co.
[6] A polymeric isocyanate sold by Mobay.

This example shows that a mole ratio of about 1:1 of acid to amine is required. At a 1:2 ratio (Polyol I) the foam collapses.

EXAMPLE VI

In this example an elastomer is prepared from the polyol in Example II and from unfilled THANOL SF-5505.

|  | D | E |
|---|---|---|
| THANOL ® SF-5505 | 250 | — |
| Polyol, Example II | — | 250 |
| Ethylene glycol | 12.5 | 12.5 |
| CoCure 30X[1] | 1.25 | 1.25 |
| ISONATE 143L[2] | 83.8 | 80.8 |
| Tensile, psi | 715 | 1066 |
| 100% moldulus, psi | 501 | 715 |
| Ultimate elongation, % | 150 | 190 |
| Tear, pli | 134 | 156 |
| Tear, propagation |  |  |
| Initial, lbs | 8.8 | 14.6 |
| Maximum, lbs | 16.3 | 22.4 |
| Shore A-2 hardness | 70 | 80 |

[1]A mercury catalyst sold by Cosan Chemical Corp.
[2]An aromatic isocyanate sold by Upjohn.

The elastomer E prepared from THANOL SF-5505 which contained a polyamide had better properties (stronger and more tear resistant) than elastomer D prepared from THANOL SF-5505 with no amide present.

EXAMPLE VII

In a 2-liter, three-necked flask equipped with a mechanical stirrer, thermometer and distillation head were placed 900 g of THANOL SF-5505, 73 g of adipic acid and 43 g of piperazine. The reaction mixture was heated to 200° C. and held for two hours. The resulting polyol was white and opaque.

EXAMPLE VIII

In a 2-liter, three-necked flask equipped as in Example VII were placed 900 g of THANOL SF-5505, 102.4 g of DuPont's DBE-2 (a mixture of dimethyl glutarate and dimethyl adipate, saponification value 11.48 meq/g) and 35.3 g of ethylenediamine. The mixture was heated to 175° C. for six hours, then for two hours at 200° C. Thirty-seven mls of overhead were obtained. The resulting polyol separated into two layers which made it undesirable for foam formation. This example demonstrates the unsuitability of ethylenediamine for forming the dispersed phase polymer.

Many modifications may be made in the methods and polyamide co-polymer polyols of this invention without departing from the spirit and scope thereof which is defined only in the appended claims. For example, one skilled in the art could probably devise a particular combination of components or method of reacting the diester and diamine and polyether polyol to give a polyamide co-polymer polyol with particularly advantageous properties.

We claim:

1. A polyamide co-polymer polyol dispersion for use in highly resilient flexible foams and elastomers made by the reaction of a dicarboxylic acid or ester derivative thereof with an aliphatic diamine where the diamine is selected from the group consisting of 1,6-hexamethylenediamine and piperazine, in the presence of a polyether polyol wherein the combined portion of dicarboxylic acid or ester derivative/aliphatic diamine co-polymer is about 1 to 30 wt. % of the polyether polyol portion and the mole ratio of diester to diamine is about 1:1.

2. The polyamide co-polymer polyol of claim 1 wherein the polyether polyol has a molecular weight in the range of about 2,000 to 8,000.

3. The polyamide co-polymer polyol of claim 1 in which the dicarboxylic acid diester is selected from the group consisting of dialkyl oxalates and dialkyl adipates.

4. The polyamide co-polymer polyol of claim 1 in which the diamine is 1,6-hexamethylenediamine.

5. A method for producing a polyurethane which comprises first making a polyamide co-polymer polyol by reacting equimolar amounts of a dicarboxylic acid or ester derivative thereof with an aliphatic diamine, where the diamine is selected from the group consisting of 1,6-hexamethylenediamine and piperazine, in the presence of a polyether polyol wherein the combined portion of dicarboxylic acid or ester derivative/diamine co-polymer is 1 to 30 wt. % of the polyether polyol portion and then reacting said polyamide co-polymer polyol with an organic polyisocyanate.

6. The method of claim 5 wherein the polyether polyol has a molecular weight in the range of about 2,000 to 8,000.

7. The method of claim 5 in which the dicarboxylic acid diester is selected from the group consisting of dialkyl oxalates and dialkyl adipates.

8. The method of claim 5 in which the diamine is 1,6-hexamethylenediamine.

* * * * *